United States Patent [19]

Pohl

[11] 4,215,907
[45] Aug. 5, 1980

[54] BALL-BEARING ARRANGEMENTS

[76] Inventor: Louis Pohl, Julius-Vosseler-Strasse 55h, 2000 Hamburg 54, Fed. Rep. of Germany

[21] Appl. No.: 913,749

[22] Filed: Jun. 8, 1978

[30] Foreign Application Priority Data

Jun. 23, 1977 [DE] Fed. Rep. of Germany ....... 2728186

[51] Int. Cl.$^2$ .................... F16C 33/58; F16C 27/00
[52] U.S. Cl. .................... 308/189 A; 74/459; 308/173; 308/193
[58] Field of Search ........... 308/173, 174, 188, 189 R, 308/189 A, 185, 193, 194, 219, 230, 232, 233; 74/441, 459

[56] References Cited

U.S. PATENT DOCUMENTS

| 768,574 | 8/1904 | Rice | 308/194 |
| 2,478,510 | 8/1949 | Stolpe | 74/459 |
| 3,669,460 | 6/1972 | Wysong | 74/459 |

FOREIGN PATENT DOCUMENTS

| 879780 | 3/1943 | France | 308/173 |
| 977603 | 4/1951 | France | 308/193 |
| 264825 | 10/1949 | Switzerland | 308/193 |
| 3586 | of 1895 | United Kingdom | 308/189 R |

Primary Examiner—Charles E. Frankfort
Attorney, Agent, or Firm—Prutzman, Kalb, Chilton & Alix

[57] ABSTRACT

The invention relates to a three point ball bearing arrangement which facilitates rotation in a desired direction and at the same time restricting unwanted relative lateral movement between the balls and its associated ball race. The arrangement provides for two annular surfaces enclosing the balls and on one surface of which one bearing point is provided and on the other surface of which two bearing points are provided. A tangent to the bearing point of the first annular surface intersects a straight line joining the two bearing points of the second annular surface at the axis of rotation of the arrangement.

5 Claims, 13 Drawing Figures

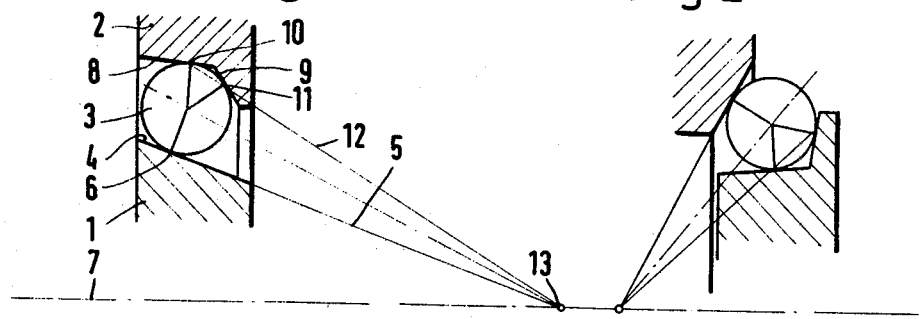
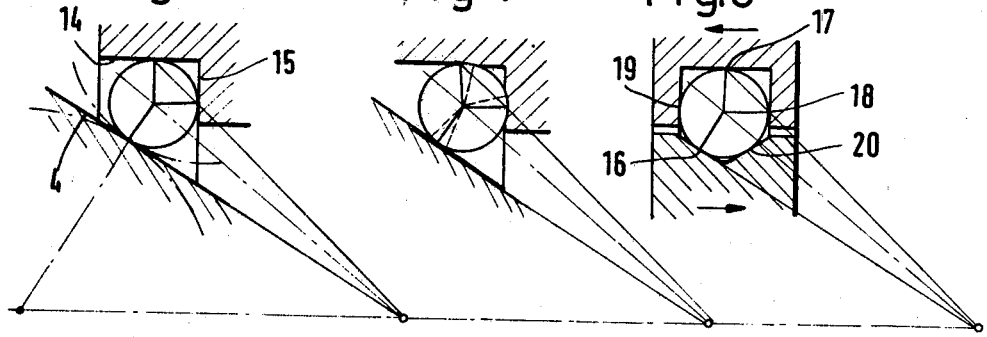
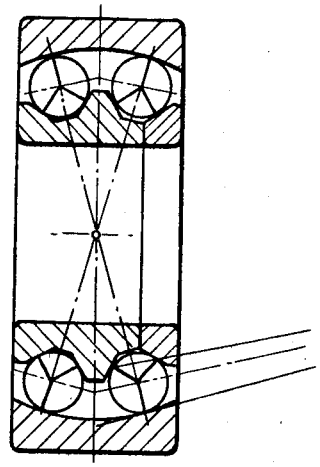
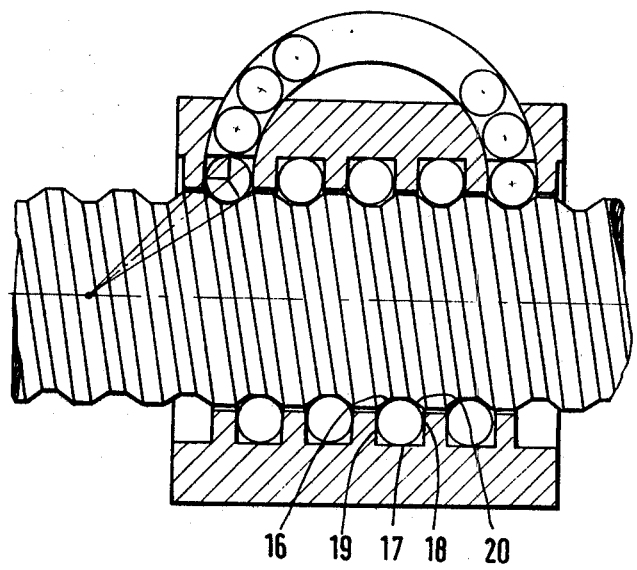

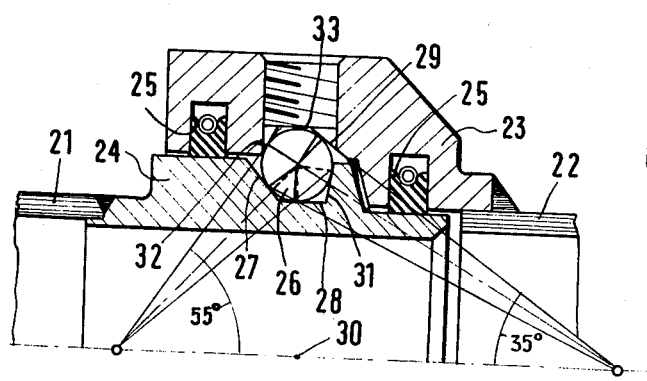
Fig. 8
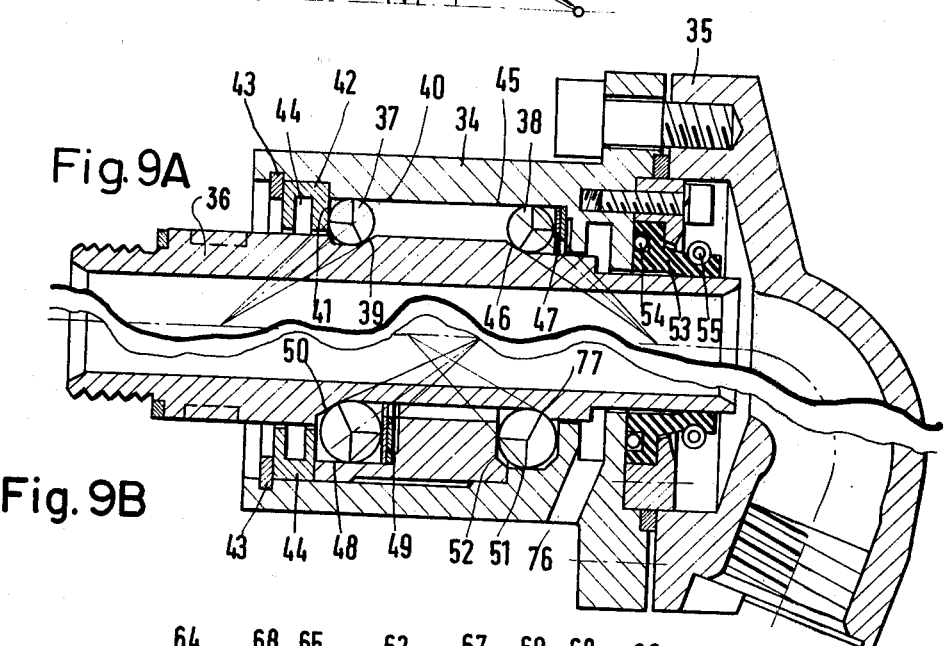
Fig. 9A
Fig. 9B
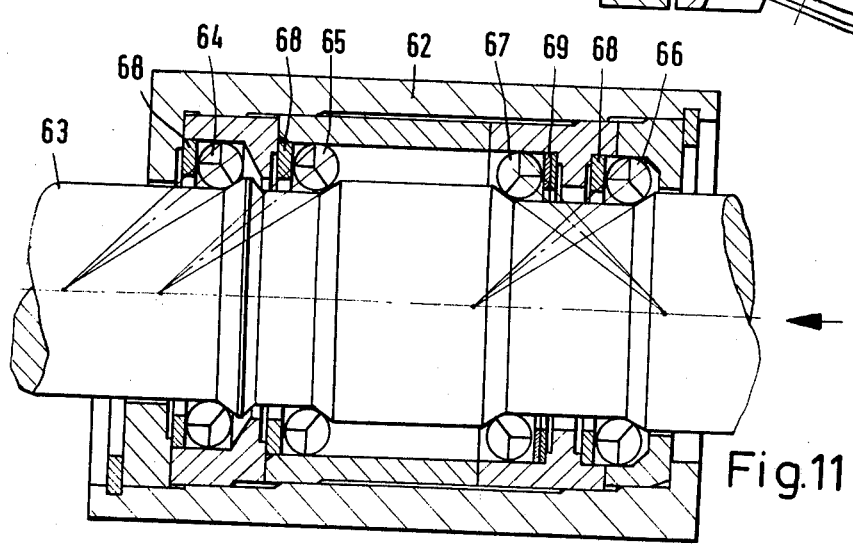
Fig. 11

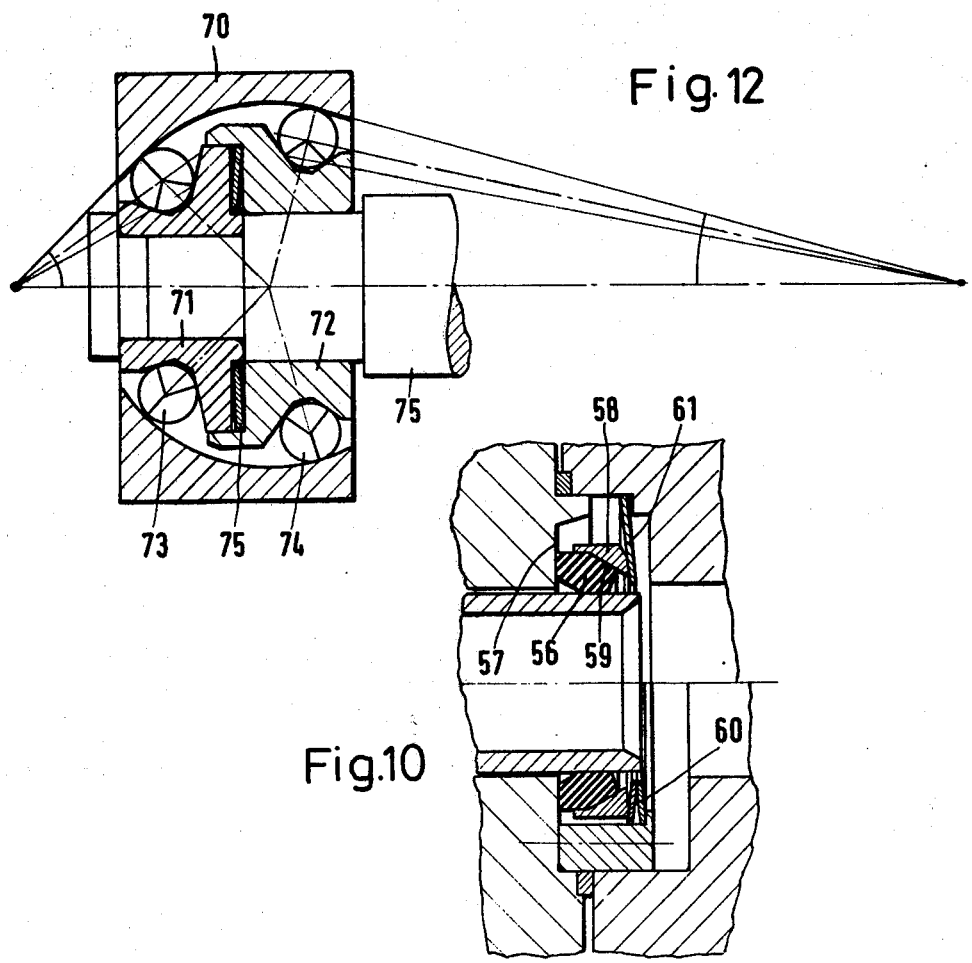

BALL-BEARING ARRANGEMENTS

The invention relates to a three-point ball-bearings arrangement with two toruses enclosing the balls, the first of which forms a bearing-point and the second of which forms two bearing-points for each ball.

Radial grooved ball bearings basically run free of sliding friction where there is an exclusively radial transmission of forces. When axial force components are added, instances of friction can occur which can lead to premature wear and cannot therefore be ignored. This is also true for the previously proposed three-point ball-bearing arrangements such as shown for example in FIG. 7 and FIG. 8 of DT-OS No. 2019 380.

An object of the present invention is to provide a three-point ball-bearing arrangement which exhibits less friction and less wear and tear even when there is inadequate lubrication, dry running or lubircation with water.

According to the present invention there is provided a three point ball bearing arrangement having two annular surfaces enclosing the balls, of which the first annular surface provides one bearing point and the second annular surface provides two bearing points for each ball, a tangent to the bearing point of the first annular surface intersecting a straight line joining the two bearing points of the second annular surface at the axis of rotation of the arrangement.

This arrangement of the present invention allows well-defined rolling without translatory relative movement between the balls and one of the ball races involved. Through appropriate selection of the tangential directions of the bearing-points in relation to the rotational axis of the arrangement, optimum force transmission can be obtained for each instance of combined axial and radial stress.

Of particular advantage are those embodiments in which one of the two bearing-points of the second annular surface is formed by a radial, plane portion of this surface. In this way, manufacture is in fact simplified. This holds good also for the case in which one of the two bearing points of the second annular surface is formed by a cylindrical portion of this surface.

Each row of balls can be arranged such that two groups of, in each instance, three bearing-points working together and operating in opoosed axial directions can be co-ordinated for each ball. In this way ideal rolling conditions under stress are obtained in both axial directions. The angle ratios here do not have to be at all symmetrical, as the axial forces which have to be taken into account in one direction or the other may be different.

So that perfect running may be guaranteed also in the transitional region between the running conditions with axial forces in one direction or the other, it is advantageous if the annular surface or surfaces on which the bearing-point(s) is/are formed exclusively by a surface or surfaces inclined to the rotational axis of the arrangement exhibit(s) an additional, substantially cylindrical guide surface.

The invention is not confined to ball tracks with a straight generatrix. To enlarge the bearing area, it is also possible to use channel-shaped tracks, in which case there may well occur minor variations from geometrically ideal rolling conditions, depending on the manufacturing precision in each case. It is also possible to use spherical ball tracks in order to make a bearing insensitive to alignment. Particularly advantageous is a double-row self-aligning ball-bearing, of which the balls are fixed in each case by two bearing-points on one part of the bearing, these bearing-points being provided in each instance by one bearing-ring for each row of balls, while on the other side they can roll on a spherical surface, free of play, being pressed against this surface by a spring which pushes the two bearing-rings apart or together as the case may be.

With ball bearings of which the tracks are formed exclusively of rigidly constructed components, bearings which are free from play cannot be constructed. They can indeed be adjusted to be free of play for particular operational and temperature conditions; heat expansions where there are variable temperatures (e.g. because of heat development due to bearing friction or because of external temperature fluctuations or elastic deformation resulting from force effects which reduce or enlarge the tolerances so that there is either undesired play or undesired pressure. Because of this, bearing lay-outs have already been equipped with a moveable ring which has for example been pre-stressed with a force which is greater than the maximum bearing force occurring. As such rings which are already known are involved in the transmission of the radial forces, they must be guided radially with great precision and be free of play, so that when they are moved, significant friction must be taken into account. When operating conditions are difficult, they cannot be used, because there is then the danger that they will seize. In every instance the pre-stressing force must be relatively large, because it has to overcome the guiding friction. The result is a heavy load on the bearing, with a great deal of wear and tear.

The present invention has now recognized that the problem of anti-friction mounting free of play can be solved with the aid of the three-point bearing arrangement hereinafter described if a bearing-point is provided by a spring lock washer disposed in a substantially radial tangential direction relative to one of the ball-bearings which are employed mostly in pairs. In contrast to known bearings with a moveable bearing-ring, no readjustment friction occurs with such an arrangement. Thus the preliminary stress does not need to be calculated for more than the maximum operational forces occurring (taking into account the manufacturing tolerances). The permanent load on the bearing from the pre-stressing forces is consequently substantially smaller. The bearing is also safer under more difficult operational conditions than are known bearings having a moveable bearing-ring, because readjustment cannot be endangered by seizing of a closely guided bearing-ring. Finally, the design is comparatively cheap because in the manufacture and installation of the spring lock washer no special accuracy is necessary. Neither the radial nor the axial precision of the bearing depends on it; for the geometrical ratios are clearly defined by the two other bearing-points of the balls.

The spring lock washer can be made from a simple Belleville spring. It is often useful to assemble a number of relatively thin Belleville springs as a package so as to obtain thereby a flatter characteristic curve and a smaller tolerance sensitivity. In most instances the bearing-point or track, as the case may be, can itself be formed from the spring element constituted by the spring lock washer. It is of course possible, however, to insert a special bearing-ring in between. Because of the generally radial disposition of the tangent at the bearing-point formed by it, it does not need to be radially guided, or at least not precisely, so that no friction problems arise.

The three-point ball-bearing envisaged in the invention having a bearing-point formed from a spring lock washer disposed in a substantially radial tangential direction, is also suitable for the serial arrangement of ball-bearings for the transmission of axial forces. In this connection these ball-bearings are so arranged, in each instance to be operative in the same direction, that such axial forces are transmitted via the spring lock washers which compensate for dimensional tolerances.

The radial guidance characteristics that can be obtained by virtue of the present invention, for a simultaneously high axial loading, are of special interest in the case of rotary connections with radial sealing. For long it has been possible to use sleeve-type seals operating radially only when pressures are relatively small, because they must be soft in order to be able to yield with non-circular rotational conditions. When higher pressure differentials occur, particularly also at a high temperature, it is necessary to go over to axially-operative slide-ring seals which not only have the disadvantage of relativly large space requirements and a complicated design, but also have a relatively large diameter, resulting in correspondingly greater relative speeds and stresses on the surface of the seal. Thus, the combination of a ball-bearing arrangement in accordance with the invention with a sleeve-type seal made of a material of limited flexibility, such as polytetrafluoroethylene, is a special feature of the invention, and one which can withstand relatively higher pressure differentials at higher temperatures.

Embodiments of the invention will now be described, by way of example, with reference to the accompanying drawings in which:

FIGS. 1 to 5 are fragmentary sectional views of a plurality of single row ball-bearing arrangements;

FIG. 6 is a sectional view of a self-aligning ball-bearing;

FIG. 7 is a sectional view of a spindle with ball race nut;

FIG. 8 is a sectional view of a tubular connection with a single-row ball mounting;

FIGS. 9A and 9B are sectional views of similar embodiments of a tubular connection with a double-row ball mounting, free of play;

FIG. 10 is a sectional view of an alternative sealing arrangement for the arrangement of FIGS. 9A and 9B;

FIG. 11 is a sectional view of a mounting arrangement on a multiple axial basis and;

FIG. 12 is a sectional view of a self-aligning ball-bearing, free from play.

Referring to FIG. 1, a bearing consists of an inner ring 1 and an outer ring 2 with balls 3 therebetween. The inner ring forms a running surface 4 which is conically shaped, so that a tangent 5 at the bearing-point 6 forms an angle with the axis of rotation 7. The outer ring 2 forms two running surfaces 8 and 9 to provide bearing-points 10 and 11. A line 12 connecting the bearing-points 10 and 11 intersects the axis of rotation 7 at the same point 13 as does the tangent 5. These geometrical relationships guarantee a clear rolling movement at the bearing-points and thus a minimum of wear.

In the embodiment exemplified in FIG. 1 the inner ring forms a bearing-point while the outer ring forms two attachment points. The converse is the case in the arrangement shown in FIG. 2, which is otherwise to be regarded as analogous to FIG. 1. In many cases it is more useful to provide two bearing-points towards the outside; this rule cannot, however, be generalised.

The embodiment exemplified in FIG. 3 is similar to that illustrated in FIG. 1 except that the surfaces 14 and 15 forming the bearing-points are cylindrical or in the form of a radial plane respectively. Such surfaces can be manufactured with great precision and comparative simplicity and are therefore preferred for many designs. Of course, a cylindrical surface can be combined with a conical surface or a radial plane surface with a conical surface. In this connection, the inner bearing surface 4 can be made spherical, so that such a ball-bearing, which can take an axial load, is self-aligning. If, on the other hand, the inner bearing surface 4 is made concave, the bearing surface of the balls and so the load capacity of the bearing is increased.

FIG. 4 shows the same design as FIG. 3 except that the bearing races of the balls are ground to form a slight ball-receiving groove.

FIG. 5 shows a design derived from that in FIG. 3, operating in both axial directions. In the case of the direction of force indicated by arrows, the bearing-points 16, 17 and 18 operate together while in the case of a force in the opposite direction, the bearing-points 20, 17 and 19 operate together. Thus in both directions of force, there is provided, in each instance, a three-point bearing with geometrically clear rolling relationships. There must of course be enough play between the bearing-points 18 and 19 so that these two bearing-points do not engage the ball at the same time. The same applies to bearing-points 16 and 20 on the inner ring.

In the case of the embodiment of the invention shown in FIG. 6 which is in the form of a self-aligning ball-bearing the geometrical relationships also involve a tangent to a bearing-point and the line connecting two bearing-points of a single ball. The geometrical relationships remain constant round an axis lying in the bearing plane where there is a rotation of the outer ring.

FIG. 7 illustrates a design for a ball race nut based on the geometrical relationships of the embodiment exemplified in FIG. 5. As regards the geometrical relations, therefore, attention may be drawn to FIG. 5, in connection with which the same reference numerals apply. Other characteristics do not require any explanation as they correspond to those of well known ball race nuts.

FIG. 8 shows a rotatable connection between tubes 21 and 22. The coupling consists of housing 23 and sleeve 24, which are positioned co-axially to each other by means of a ball-bearing and are sealed off from each other by sealing rings 25. The bearing-points for balls 26 of the ball-bearing are located in opposition to forces which press the tubes apart, on a conical surface 27 and a cylindrical surface 28 of the sleeve and a conical surface in the housing, which surface is relatively steeply inclined, i.e. in the example shown at around 55° to the axis of rotation 30. In the case of forces working in opposition the bearing-points which become effective are formed by the corresponding surfaces 28, 31 and 32. In this connection, surface 32 has a smaller angle of inclination than surface 29 in relation to axis 30, because the axial forces to be taken up by it, which operate against the internal pressure in tubes 21 and 22 are as a rule less than those which are to be taken up by surface 29.

In the transition region 33 between surfaces 29 and 32, the housing design is cylindrical with little play in relation to ball 26, so that a mounting is ensured which is free from play also in the transitional region as a result of axial forces operating in two directions. This example shows that the invention makes it possible to select a geometrical relationship for any direction of force so that the most favourable stress relationships result. In the figure, a ball-inserting aperture sealed by a screw stopper is shown.

FIGS. 9A and 9B also show similar examples of a form of rotatable tubular connection with a housing consisting in FIG. 9A of sections 34 and 35 and a sleeve 36 which is mounted free of play in housing section 34 through rows of balls 37 and 38.

Varying possible constructions for the bearing are shown in FIGS. 9A and 9B. The construction in FIG. 9A provides a running surface 39 on the sleeve 36 for the row of balls 37, and opposite this running surface there are two running surfaces 40 and 41 in the housing or in a housing ring 42 which is secured to the housing by a retaining ring 43 and can be sealed off in relation to the outside in the usual way by a seal 44.

The bearing-points for the row of balls 38 on the right hand side are constituted by a cylindrical bearing surface 45 in housing section 34, a conical running surface 46 on the sleeve 36, and a spring lock washer 47 which extends radially and is composed of two Belleville springs. The dimensions are so calculated, that after installation of the retaining ring 43, the spring lock washer 47 lies against the row of balls 38. In this way the arrangement of the bearing is free from play. On the one hand, the preliminary stress can be selected to be relatively small because the forces operating do not need to be taken up by the spring lock washer 47. The axial forces deriving from the internal pressure are rather transmitted by the balls 37.

On the other hand, the spring lock washer 47 must be dimensionally thick enough that the radial forces operating on row of balls 38 can be taken up by way of the inclined surface 46. As these radial forces are often greater on the row of balls 38 than on the row of balls 37, the arrangement shown in FIG. 9B may often be more advantageous. With this design, two bearing-points on the housing side are provided for row of balls 37, viz. on cylindrical and radial bearing surfaces 48 and 49 which are formed on housing section 34 and on a spring lock washer respectively. On the sleeve 36, a bearing-point is constituted for balls 37 on a conical bearing surface 50. The bearing-points for row of balls 38 are formed on the housing side by a cylindrical running surface 51 and a radial running surface 52 and on the sleeve side by running surface 77. The spring lock washer need be dimensioned, in this regard, so that it is only sufficiently thick for it to be impossible, even when there is a lack of internal pressure, for relative axial movement to take place between the sleeve and the housing as a result of accidental forces. It is simply inserted against a bracket in the housing bore, radial tolerances not being involved because it fulfils no radial guiding function in the bearing. Even deviations from the radial plane are insignificant, because they move the bearing-point only a little and therefore do not basically alter the geometrical relationships.

Mounting free of play makes it possible to use a somewhat rigid washer which as a result has little similarity to usual flexible sleeve washers. They may therefore be designated radial slide ring washers. They have the advantages of the well-known axial slide ring washers, without being as complicated. Through the use of relatively hard materials for the sleeve or collar they can be employed at high temperatures.

In the embodiment shown in FIG. 9A a thickened portion of collar 53 fits against a radial surface of housing section 34 and is sealed off in relation thereto by, for example, an O-ring 54. A thinner right hand portion of the collar is pressed radially against the surface of the sleeve 36 by a worm spring 55.

In the embodiment shown in FIG. 10, a collar 56, in the form of a block in transverse section, abuts on its left-hand side, against a radial surface 57 of the housing, while its right-hand side is pressed radially inwards against the surface of the sleeve by a conical or wedge-shaped ring 58 by way of an inclined surface 59. The wedge-shaped ring 58 is subject to the force of a Belleville spring 61 (above) or two Belleville springs 60 (below) in each case according to the local radial circumstances. As a result of the preliminary stres by springs 60, 61 and of the internal pressure of the arrangement, the washer 56 is pressed against the radial surface 57 so that in many cases one can dispense with additional sealing (as in the case of FIGS. 9A and 9B). Because of the freedom from play, radial flexibility in the collar is not necessary. The collar can therefore be of a relatively rigid and thick material, the flexibility of which is only great enough for it to be capable of being pressed with adequate pressure against the surface of the sleeve. A suitable material is, for instance, polytetrafluoroethylene.

Between washer 53 or 56 (FIG. 9A or FIG. 10 respectively) and the ball-bearing arrangement, there can be a suitable sealing element which prevents seepage into the mounting. Through a bore 76 (FIG. 9B) a blocking medium can be introduced or seepage can be drawn off.

FIG. 11 shows a mounting between a housing 62 and a shaft 63, which mounting contains three rows of balls 64, 65, 66 operative in one axial direction, and one row of balls 67 operating in the other axial direction.

Rows of balls 64, 65 and 66 lie between running surfaces which are conical on the shaft 63 and which on the housing are cylindrical and radial respectively. In this connection, the radial running surface is in each case formed by a spring lock washer 68 which is supported only near its outer periphery on the side remote from the balls and therefore can yield axially in the neighbourhood of the bearing-point. The flexibility is selected to be such that measurement tolerances can be compensated for and balls 64, 65 and 66 thus transmit more or less equal forces in an axial direction. However, the flexibility is so small that no substantial deviation from the radial plane occurs, and thus the geometrical relationship intended to ensure substantially perfect rolling are essentially retained and the axial forces occurring in the direction of the arrow can be taken up.

The row of balls 67 belongs to a pre-stress bearing arranged to be operative in the opposite direction. The balls 67 lie between a conical shaft surface, a cylindrical housing surface and a spring lock washer 69 which is softer than spring lock washer 68, as can be seen in the drawing from the fact that they are constructed of two Belleville springs. Its function is simply to maintain the condition of the assembly should there be a failure of forces operating to the left on the shaft, and where desired, to ensure freedom from play. It is placed more centrally than the row of balls 66, so that radial forces can be more readily taken up should moments occur about an axis normal to the axis of rotation.

A self-aligning ball-bearing shown in FIG. 12, being free from play, has a spherical external ring 70 and two inner rings 71 and 72, forming tracks having two bearing points for rows of balls 73 and 74 respectively. The rings are situated coaxially but can be moved in relation to each other in an axial direction on the shaft 75 and are urged apart by a Belleville spring 75 so that balls 73 and 74 fit against outer ring 70 without play. In the example shown, high axial forces can be taken up by the bearing in one direction, which is not the case with self-aligning bearings of the known types. The inner ring 71 transmitting the axial forces is rigidly linked to the shaft 75.

I claim:

1. In a three-point annular ball bearing arrangement comprising a first bearing ring having a first inclined annular ball bearing surface with a tangent at its bearing point oblique to and intersecting the axis of rotation of the ball bearing arrangement, a second bearing ring having a second annular ball bearing surface, and a third bearing ring having a third radial annular ball bearing surface and connected for common rotation with the second bearing ring, the third bearing ring being axially moveable and the third radial annular bearing surface having radial tangent at its bearing point and being axially biased toward the first inclined annular bearing surface, the improvement wherein the third bearing ring is a spring washer which itself, axially biases the third radial annular bearing surface toward the first inclined annular bearing surface and wherein a line connecting the bearing points on the second and third annular bearing surfaces intersects the axis of rotation at the intersection of the bearing point tangent of the first annular bearing surface.

2. An arrangement according to claim 1, in which at least one ball-bearing is arranged for operation in one direction , each such ball-bearing having an associated spring washer assembled so as to be free from play relative to a further ball-bearing operative in the axially opposite direction.

3. An arrangement according to claim 2 in combination with a housing, a shaft mounted for rotation therein and a seal between the housing and shaft, said seal comprising a collar fixed in the housing and sealingly engaging the periphery of the shaft, the collar being formed of a material of limited flexibility such as polytetrafluoroethylene.

4. A three-point annular ball bearing arrangement according to claim 1 wherein the second annular bearing surface is a cylindrical bearing surface.

5. A three-point annular ball bearing arrangement according to claim 1 or 4 further comprising a substantially cylindrical ball bearing guide surface.

* * * * *